(12) United States Patent
Roberts et al.

(10) Patent No.: US 9,542,010 B2
(45) Date of Patent: Jan. 10, 2017

(54) SYSTEM FOR INTERACTING WITH OBJECTS IN A VIRTUAL ENVIRONMENT

(75) Inventors: Michael Roberts, Los Gatos, CA (US); Nicolas B. Ducheneaut, Sunnyvale, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 994 days.

(21) Appl. No.: 12/559,897

(22) Filed: Sep. 15, 2009

(65) Prior Publication Data

US 2011/0063286 A1    Mar. 17, 2011

(51) Int. Cl.
*G06F 3/0346* (2013.01)
*G06F 3/0481* (2013.01)

(52) U.S. Cl.
CPC ......... *G06F 3/0346* (2013.01); *G06F 3/04815* (2013.01)

(58) Field of Classification Search
CPC ............................ G06F 3/0346; G06F 3/04815
USPC ......................................................... 715/864
See application file for complete search history.

(56) References Cited

U.S. PATENT DOCUMENTS

| | | | |
|---|---|---|---|
| 7,949,633 B1 * | 5/2011 | Shaver et al. | ................. 707/620 |
| 2006/0013440 A1 * | 1/2006 | Cohen et al. | ................. 382/103 |
| 2006/0044268 A1 | 3/2006 | Robin | |
| 2007/0191025 A1 * | 8/2007 | McBrierty et al. | ......... 455/456.2 |
| 2007/0233759 A1 * | 10/2007 | Tomlinson et al. | ............ 708/200 |
| 2008/0037612 A1 * | 2/2008 | Tudosoiu | ...................... 375/147 |
| 2008/0076559 A1 * | 3/2008 | Richardson et al. | ............ 463/36 |
| 2008/0214253 A1 * | 9/2008 | Gillo et al. | ........................ 463/1 |
| 2009/0309846 A1 * | 12/2009 | Trachtenberg et al. | ....... 345/173 |
| 2010/0037151 A1 * | 2/2010 | Ackerman et al. | ............ 715/753 |

FOREIGN PATENT DOCUMENTS

| | | |
|---|---|---|
| EP | 0558006 A2 | 9/1993 |
| EP | 1783591 A1 | 5/2007 |
| WO | 03010653 A1 | 2/2003 |
| WO | 03050726 A1 | 6/2003 |
| WO | 2006036069 A1 | 4/2006 |
| WO | 2009031860 A2 | 3/2009 |

* cited by examiner

*Primary Examiner* — Angie Badawi
(74) *Attorney, Agent, or Firm* — Shun Yao; Park, Vaughan, Fleming & Dowler LLP

(57) ABSTRACT

A system that facilitates interaction with a 3-dimensional (3-d) virtual environment is described. In this system, a controller device provides information associated with the 3-d virtual environment to a first display. Furthermore, the system includes at least one portable electronic device, which includes a second display and a 3-d motion sensor that detects motion of the portable electronic device, such as: linear motion, rotational motion and/or a gesture. This portable electronic device communicates the detected motion to the controller device. In response, the controller device provides a subset of the 3-d virtual environment and associated context-dependent information to the portable electronic device, which are displayed on the second display.

22 Claims, 5 Drawing Sheets

SYSTEM FOR INTERACTING WITH OBJECTS IN A VIRTUAL ENVIRONMENT

BACKGROUND

Field

The present disclosure relates to a system and technique to facilitate interaction by multiple users with a 3-dimensional (3-d) virtual environment.

Related Art

Networked electronic devices, such as computers, are increasingly popular. These devices facilitate increased communication, interaction and collaboration among users.

Interactions among multiple users of networked electronic devices are often facilitated using virtual environments (which are also referred to as 'virtual worlds' or 'virtual reality'). However, using existing systems and software tools, these interactions can become more difficult as the number of users in these systems increases. For example, if multiple users attempt to manipulate objects, such as avatars, at the same time in a virtual environment, the displays on their networked electronic devices may become cluttered by their actions, as the interaction widgets associated with different users' actions are displayed with the common content of the virtual environment. Similarly, it can be difficult for large numbers of users to collaboratively edit or modify common content using a virtual environment, because a user's actions may be obscured by another user's actions in the virtual environment.

Hence, what is needed is a method and a system that facilitates the interaction of multiple users in a virtual environment without the problems listed above.

SUMMARY

One embodiment of the present disclosure provides a system to facilitate interaction with a 3-dimensional (3-d) environment. This system includes a controller device that stores information associated with the 3-d environment. Moreover, the system includes a first display, which is coupled to the controller device, and which displays the 3-d environment. Furthermore, the system includes at least one portable electronic device that communicates information with the controller device. This portable electronic device includes a 3-d motion sensor that detects motion of the portable electronic device, including: linear motion, rotational motion and/or a gesture. In addition, the portable electronic device includes a second display that displays a 3-d rendered subset of the 3-d environment and associated context-dependent information based on the detected motion.

Note that the portable electronic device may include a cellular telephone. Furthermore, the 3-d motion sensor may include an accelerometer.

In some embodiments, the 3-d environment may include virtual reality. Additionally, the subset of the 3-d environment may include at least a portion of an object or at least a portion of an avatar.

Moreover, the detected motion may correspond to motion in the 3-d environment, such as linear motion and/or rotational motion. Alternatively or additionally, the detected motion may select the object or the avatar in the 3-d environment. For example, the object may be selected using a gesture.

In some embodiments, the context-dependent information includes a menu associated with the subset of the 3-d environment. Therefore, the detected motion may correspond to navigating through the menu.

In some embodiments, the system includes multiple portable electronic devices that are associated with users. Note that a given portable electronic device may display a given subset of the 3-d environment and the associated context-dependent information to a given user based on detected motion of the given portable electronic device. Moreover, the 3-d environment displayed on the first display may include information common to the users. Additionally, 3-d rendered subsets of the 3-d environment displayed on at least two portable electronic devices may be different.

This system may facilitate collaborative editing by the users of the information in the 3-d environment and/or collaborative interaction of the users in the 3-d environment.

In some embodiments, the controller device provides feedback to at least two of the users via the associated portable electronic devices if a conflict, associated with changes to the information provided via the associated portable electronic devices, occurs in the 3-d environment.

Furthermore, the second display may include a touch-sensitive display that displays the 3-d rendered subset of the 3-d environment and the associated context-dependent information based on a user's interaction with a surface of the second display.

Additionally, the portable electronic device may provide a unique identifier to the central controller. In response, the controller device may initially provide the 3-d rendered subset of the 3-d environment and the associated context-dependent information for display on the second display based on the unique identifier.

Another embodiment provides a method for interacting with a 3-d environment, which may be performed by the controller device. During operation, the controller device accesses stored information associated with the 3-d environment, and provides the information associated with the 3-d environment to a first display for display. Then, the controller device receives a request from the portable electronic device for the 3-d rendered subset of the 3-d environment and the associated context-dependent information. Note that the request may be based on detected motion of the portable electronic device, and the detected motion of the portable electronic device may include: linear motion, rotational motion and/or a gesture. Next, the controller device provides to the portable electronic device the subset of the 3-d environment and the associated context-dependent information for display on a second display of the portable electronic device.

Another embodiment provides a computer-program product for use in conjunction with the system. This computer-program product includes instructions for at least some of the above-described operations.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a system, a method, and a computer-program product (e.g., software) to facilitate interaction with a 3-d virtual environment are described. In this system, a controller device provides information associated with the 3-d virtual environment to a first display. Furthermore, the system includes at least one portable electronic device, which includes a second display and a 3-d motion sensor that detects motion of the portable electronic device, such as: linear motion, rotational motion and/or a gesture. This portable electronic device communicates the detected motion to the controller device. In response, the controller device provides a 3-d rendered subset of the 3-d virtual environment and associated context-dependent information to the portable electronic device, which are displayed on the second display.

The system allows multiple users to view and/or change the information associated with the 3-d virtual environment at the same time. In particular, each user can view a 3-d rendered subset of the information that is relevant to them, as well as the associated context-dependent information (such as a menu). Concurrently, the full 3-d virtual environment is presented on the first display, thereby providing an overview of the information (i.e., situation awareness) to all the users. Furthermore, the users can manipulate or change the subsets of the information on their portable electronic device without causing clutter or obscuring the information displayed on the first display. In this way, the system facilitates collaborative editing by the users of the information in the 3-d virtual environment and/or collaborative interaction of the users in the 3-d virtual environment.

Figure 1:
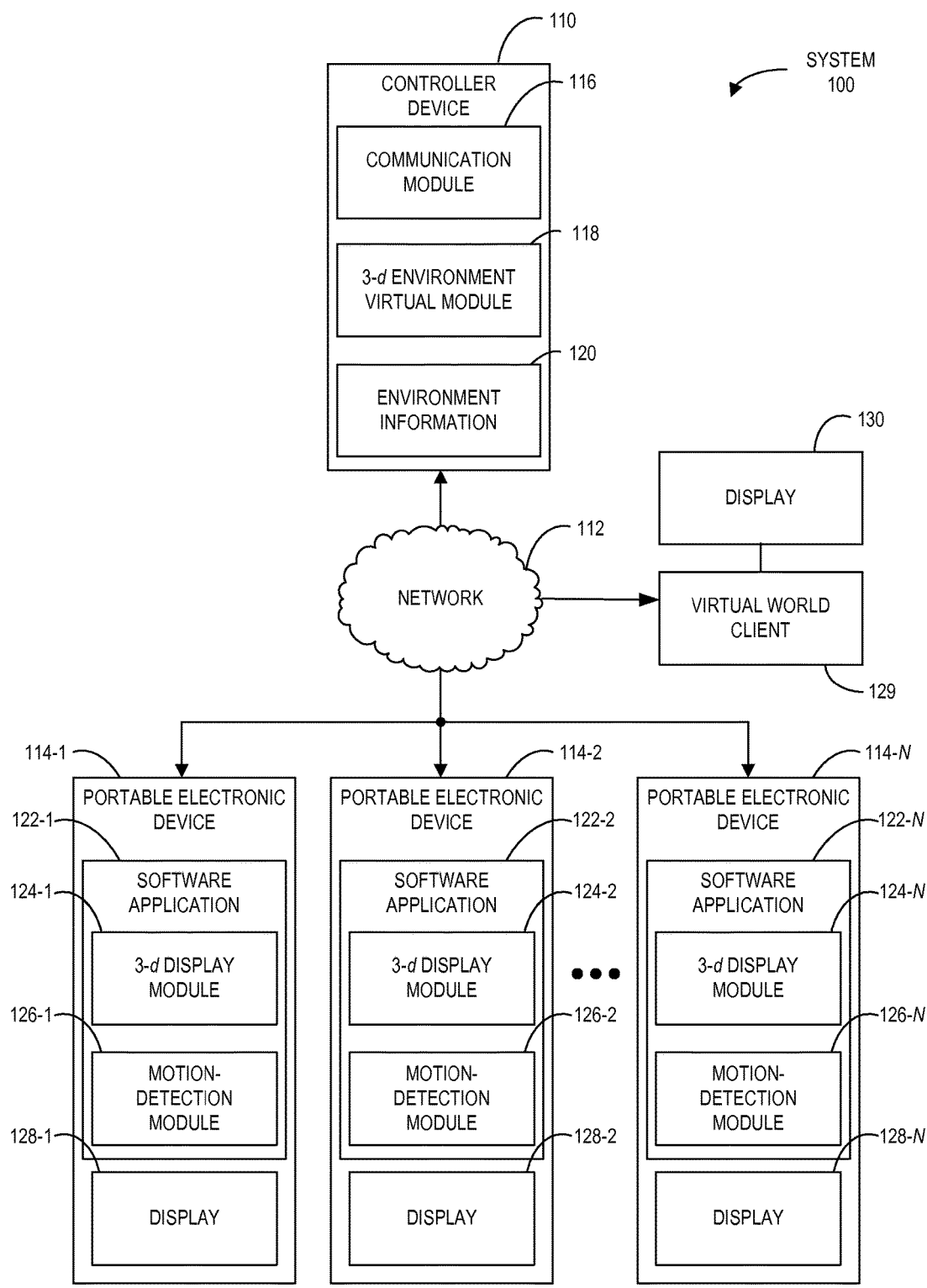
FIG. 1 is a block diagram illustrating a system in accordance with an embodiment of the present disclosure.

We now discuss embodiments of a system that facilitates interaction with the 3-d virtual environment. FIG. 1 presents a block diagram illustrating a system 100. This system allows one or more users of corresponding portable electronic devices 114 to interact with, modify and/or control information in a 3-d virtual environment, such as a virtual space or virtual reality. In particular, 3-d virtual environment module 118 in a controller device 110 in system 100 accesses stored environment information 120, and generates the 3-d virtual environment based on environment information 120. Then, 3-d environment module 118 provides signals or instructions to a virtual world client 129, which is coupled to controller device 110 via communication module 116 and network 112. Virtual world client 129 can be software-based or hardware-based, and is in communication with a display 130 (such as a large flat-screen or projection display). Display 130 in turn displays the 3-d virtual environment to the one or more users.

Separately or concurrently, the users may use portable electronic devices 114 to interact with, manipulate and/or modify the information (or content) associated with the 3-d virtual environment. For example, each of portable electronic devices 114, such as portable electronic device 114-1, may include a 3-d motion sensor (such as an accelerometer) that detects motion of the portable electronic device, including: linear motion, rotational motion and/or a gesture. Detected motion of portable electronic device 114-1 may correspond to motion of an object or avatar in the 3-d virtual environment. Thus, the user of portable electronic device 114-1 may use this device as a 'magic wand' to manipulate objects in the 3-d virtual environment displayed on display 130.

Alternatively or additionally, the detected motion may select the object or the avatar in the 3-d virtual environment (for example, the object may be selected using the gesture) for display on portable electronic device 114-1. For example, a user of portable electronic devices 114-1 may move this device in order to select or modify the presentation of one or more objects, and more generally, a 3-d rendered subset of the information in the 3-d virtual environment. Motion-detection module 126-1 in software application 122-1 may interpret the detected motion of portable electronic device 114-1 (for example, as a manipulation of a local cursor), and may accordingly provide a request for the corresponding subset of the information in the 3-d virtual environment (such as at least a portion of an object or at least a portion of an avatar), as well as associated context-dependent information (such as a menu or interaction widget associated with at least a portion of the object or avatar), to controller device 110 via communication module 116 and network 112. In response, controller device 110 may provide the requested subset of the information and the associated context-dependent information to portable electronic device 114-1. Then, 3-d display module 124-1 in software application 122-1 may display the subset of the information and the associated context-dependent information on display 128-1.

Subsequently, the user may manipulate and/or change the presentation and/or modify the subset of the information and/or the associated context-dependent information displayed on portable electronic device 114-1 by moving portable electronic device 114-1. For example, by moving portable electronic device 114-1, the user may be able to navigate through a menu associated with the subset of the information, and may be able to select a particular command in the menu.

Alternatively or additionally, by moving portable electronic device 114-1, the user may be able to change the orientation of the object on display 128-1, and/or may be able to edit or change the object. For example, by moving portable electronic device 114-1, the user may change the perspective or orientation of axes in the virtual environment. Consequently, the user may dynamically 'interact' with the content in the virtual environment, such that actions of the user may modify the content and how it is displayed.

Note that these presentation and/or content changes may not be displayed on displays 128 in the other portable electronic devices 114 or on display 130 until the user allows the global information to be updated or until a subsequent user session occurs. However, in some embodiments the changes made to the subset of the information on each of portable electronic devices 114 may be displayed on display 130 in real time, i.e., without delay or without waiting for user approval. In either case, controller device 110 may store or maintain the information, including any user-specific changes, in environment information 120 for use in the same user session and/or in a subsequent user session.

In this way, each user may 'see' or interact with a 3-d rendered subset of the information and the associated context-dependent information that is appropriate or of interest to them via their corresponding portable electronic devices 114. (Thus, the subsets of the information displayed on at least two portable electronic devices 114 may be different.) Furthermore, the information in the 3-d virtual environment on display 130 may provide an overview (or situational awareness) regarding common information to all the users without becoming cluttered by the various changes made by the users to the subsets of the information displayed on their corresponding portable electronic devices 114.

Therefore, portable electronic devices 114 in system 100 may provide interfaces to the 3-d virtual environment that allow the users to interact with each other and the content in the same 3-d virtual environment, both via the information in the 3-d virtual environment on display 130 and the subsets of the information displayed on displays 128.

In some embodiments, portable electronic devices 114 include cellular telephones, such as so-called 'smart' phones. However, a wide variety of portable electronic devices may be used, including: a tablet computer, a personal digital assistant, and/or a notebook or laptop computer.

In some embodiments, controller device 110 provides feedback to at least two of the users via their associated portable electronic devices if a conflict, associated with changes to the information provided via the associated portable electronic devices, occurs in the 3-d virtual environment. For example, a cellular telephone's vibrate mode can be used to provide feedback to each of these users. If one of the users attempts to manipulate an object already being 'controlled' by another user, this user's cellular telephone may vibrate, thereby indicating that the attempt or request has been denied. Note that such tactile feedback may also be used to provide an indication of the 'roughness' of terrain in the 3-d virtual environment, for example, if a user's avatar is moving in the 3-d virtual environment.

Furthermore, in some embodiments portable electronic devices 114 each provide a unique identifier to central controller device 110. In response, controller device 110 may initially provide the subset of the 3-d virtual environment and the associated context-dependent information for display on displays 128. For example, signals from a cellular telephone can identify the cellular telephone. Based on this identification, system 100 can select an appropriate avatar for the user and can log the user into system 100.

While the preceding discussion has used motion as an illustrative example of a way to manipulate or control information in the 3-d virtual environment, other user-interface techniques may be used. For example, displays 128 may include touch-sensitive displays. A user may manipulate, control and/or modify the subset of the 3-d virtual environment and the associated context-dependent information displayed on portable electronic device 114-1, as well as the information in the 3-d virtual environment displayed on display 130, by touching a surface of display 128-1 and activating virtual widgets or icons.

Additionally, while the virtual environment is 3-d, in some embodiments the virtual environment is 2-dimensional (2-d). Furthermore, the information or content may be 2-d (such as flat text) or 3-d. For example, as described below with reference to FIG. 3, the information may include a complicated object, which includes multiple inter-related components or components that have a spatial relationship with respect to each other. More generally, the content maintained in system 100 may include a variety of data, including: text, audio, music, images, and/or temporal image information (such as an animation sequence). Additionally, this data may be compatible with a variety of formats, including: image formats (such as a Joint Photographic Experts Group standard), video formats (such as a Moving Pictures Expert Group standard), and word-processing or information-display formats (such as Adobe Acrobat™, from Adobe Systems, Inc. of San Jose, Calif.). Note that controller device 110 may store this information or content either locally and/or remotely in system 100.

Note that software applications 122 may be resident on and may execute on respective portable electronic devices 114, such as portable electronic device 114-1. For example, software application 122-1 may be a standalone program or may be embedded in another software application. Alternatively, the software application may be a software-application tool that is embedded in a web page, e.g., the software application may execute in a virtual operating environment provided by a web browser. (Thus, system 100 may implement a client-server architecture.) In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by the web browser or another client application on portable electronic devices 114.

Figure 2:
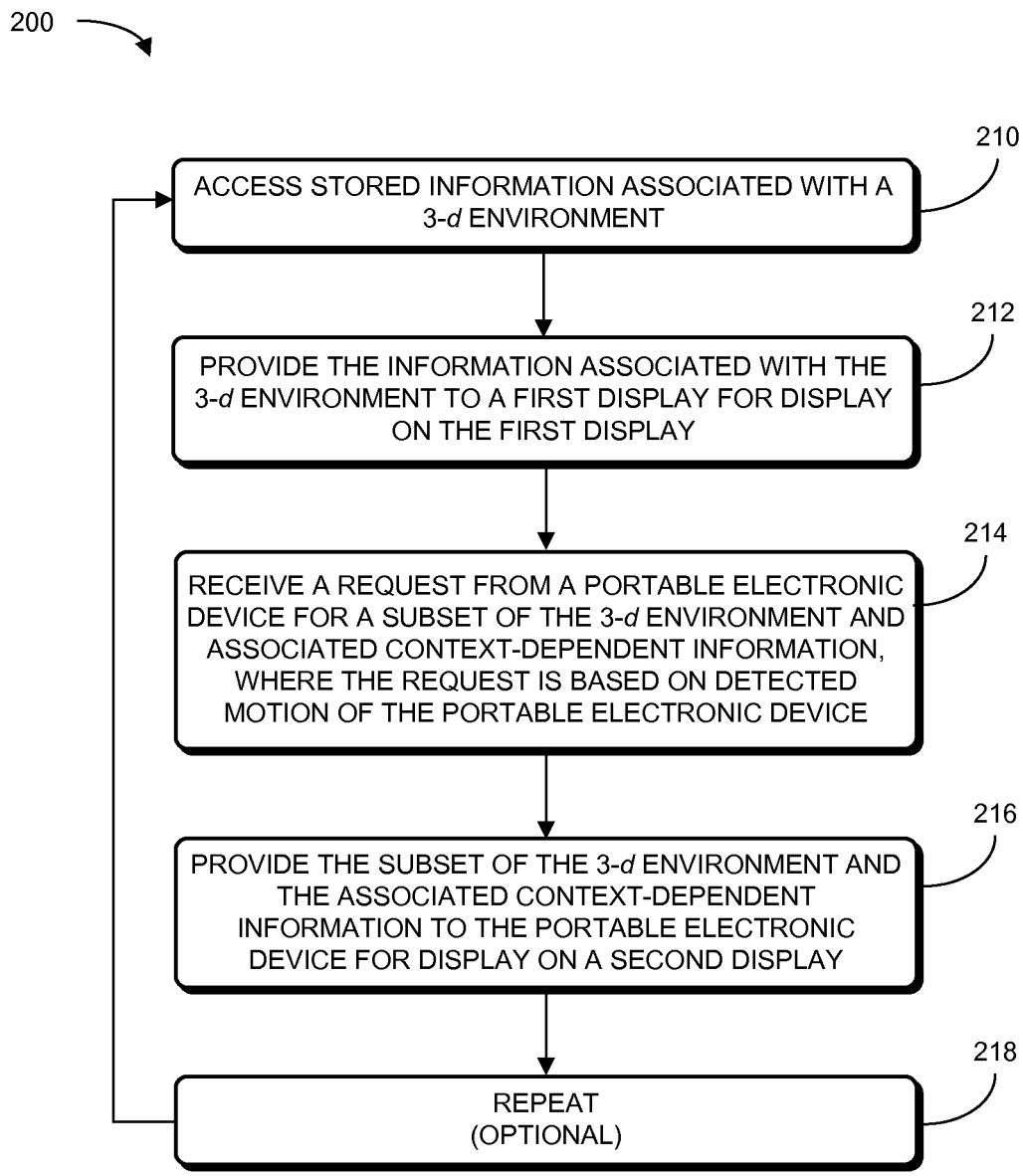
FIG. 2 is a flow chart illustrating a process for interacting with a 3-dimensional (3-d) environment in accordance with an embodiment of the present disclosure.

We now describe a process of operating system 100. FIG. 2 presents a flow chart illustrating a process 200 for interacting with the 3-d virtual environment, which may be performed by controller device 110 (FIG. 1). During operation, the controller device accesses stored information associated with the 3-d environment (operation 210), and provides the information associated with the 3-d environment to a first display for display (operation 212). Then, the controller device receives a request from the portable electronic device for the subset of the 3-d environment and associated context-dependent information (operation 214). Note that the request is based on detected motion of the portable electronic device, and the detected motion of the portable electronic device may include: linear motion, rotational motion and/or a gesture. Next, the controller device provides to the portable electronic device the subset of the 3-d environment and the associated context-dependent information for display on a second display of the portable electronic device (operation 216).

In some embodiments, process 200 includes additional or fewer operations. For example, operations 210-216 may be optionally repeated (operation 218) multiple times for the same user and/or for one or more other users in the multiple users. Moreover, the order of the operations may be changed and/or two or more operations may be combined into a single operation.

Figure 3:
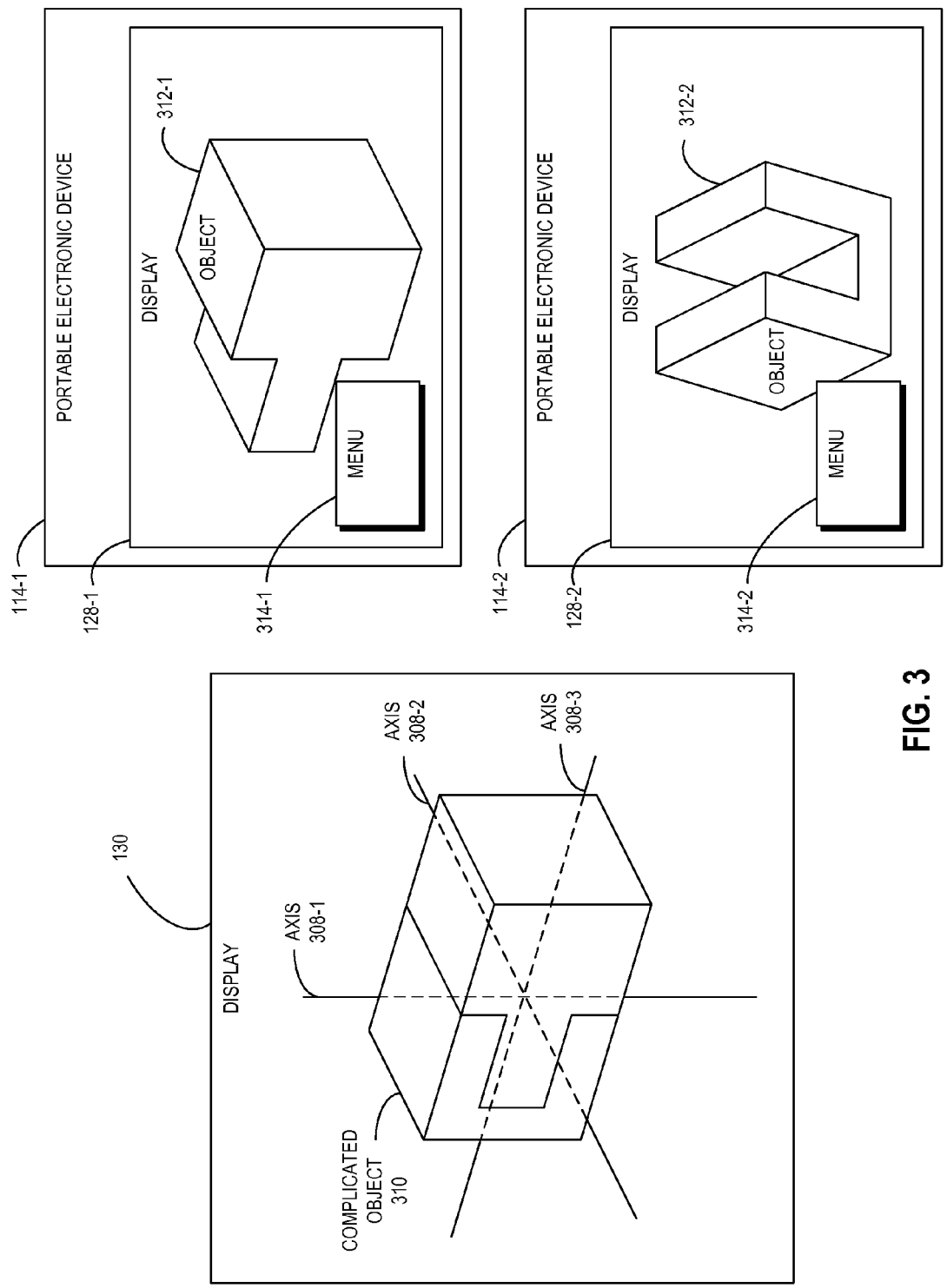
FIG. 3 is a drawing of information displayed on the display and the portable devices of FIG. 1 in accordance with an embodiment of the present disclosure.

We now describe embodiments of a user interface in software applications 122 (FIG. 1). FIG. 3 presents a drawing of the information in the 3-d virtual environment displayed on display 130, and the subsets of the information and the associated context-dependent information displayed on displays 128 in portable devices 114 of system 100 (FIG.

1). In particular, display 130 displays complicated object 310 (such as a complicated machine) in a virtual environment (with axes 308). By moving their portable electronic devices 114 and/or touching the surfaces of displays 128, users may select portions of complicated object 310, such as objects 312-1 and 312-2.

Furthermore, the users may manipulate, control and/or modify the subsets of the information and the associated context-dependent information displayed on displays 128. For example, a user of portable electronic device 114-2 may move this device in order to navigate through associated menu 314-2 (i.e., the associated context-dependent information). In the process, the user may rotate or change the presentation of object 312-2 on display 128-2. However, the common information for complicated object 310, which is displayed on display 130, may remain unchanged. Menu 314-2 may include information about object 312-2, such as: components, material composition and/or a history of revisions. In some embodiments, the user of portable electronic device 114-2 may repair or work on object 312-2 with one hand while holding portable electronic device 114-2 in the other.

In an exemplary embodiment, portable electronic device 114-1 displays a context-dependent menu 314-1 (or an interaction widget) associated with an avatar in the 3-d virtual environment. When a user of portable electronic device 114-1 is controlling the avatar, an avatar-puppeting widget and menu may be displayed. More generally, when the user is controlling an object in a virtual world, a menu and/or widget specific to that object may be displayed. Furthermore, the user can toggle portable electronic device 114-1 between an avatar mode (which is used to control the avatar) and an object mode (which is used to control a virtual object). In the avatar mode, the user can select emotes (which the avatar responds to), or can select movement controls or locations. In the object mode, system 100 (FIG. 1) displays a 3-d cursor in the 3-d virtual environment, which can be used to select an object. More generally, in these operating modes, portable electronic device 114-1 may be used as a virtual cursor, or as a proxy for the selected object or avatar.

When the user interacts with a menu/widget on portable electronic device 114-1 (for example, by moving portable electronic device 114-1), commands are sent to 3-d environment module 118 (FIG. 1) via network 112 (FIG. 1), for example, using a communication protocol such as Bluetooth™ (from Bluetooth SIG Inc, of Bellevue, Wash.) or the Internet Protocol Suite (TCP-IP).

Note that motion-detection modules 126 (FIG. 1) may support several modes of interaction while users manipulate objects and/or avatars in the 3-d virtual environment using portable electronic devices 114. In some embodiments, by moving portable electronic device 114-1 along one or more axes of physical space, a corresponding cursor or avatar is moved in the 3-d virtual environment. However, in this mode of interaction, there may be a limit to the size of the movement. Consequently, limits to motion may be defined so that the user can only manipulate objects in the immediate vicinity in the 3-d virtual environment. When portable electronic device 114-1 is outside of these limits, the avatar or cursor may scroll in that direction. Alternatively, by tilting portable electronic device 114-1, the cursor or avatar can be likewise moved in the 3-d virtual environment. Furthermore, as the user moves through the 3-d virtual environment, a 2-d map of their location may be displayed on display 128-1 (FIG. 1), and this map may scroll as the user moves.

In some embodiments, the 3-d virtual environment responds to a set of gesture commands, which can be sent by manipulating or moving portable electronic device 114-1. For example, a series of rapid horizontal swipes may be translated by motion-detection module 126-1 (FIG. 1) into deletion of the currently selected 3-d object. Similarly, a counterclockwise circular motion, like unscrewing a lid, may be translated by motion-detection module 126-1 (FIG. 1) as an 'ungroup' operation, thereby separating the current object into its component parts or pieces. While these operations are being performed, display 128-1 may be used to display information pertinent to the user, thereby freeing up space on display 130 for other uses.

Another application of system 100 (FIG. 1) is in collaborative editing. If multiple users attempt to edit 3-d objects on display 130 at the same time, there could be a very large number of pop-up menus, toolbars, etc. being displayed simultaneously. The resulting clutter and possible occlusion of objects of interest may make it difficult for the users to work together. However, by moving these menus and toolbars onto each individual user's portable electronic device, display 130 can provide a clean display of all 3-d objects and their positions in the 3-d virtual environment, while users are provided subsets of the information relevant to their current editing task on their portable electronic devices 114.

Therefore, system 100 (FIG. 1) may facilitate collaborative editing by the users of the information in the 3-d virtual environment, such as editing of: a document, an online encyclopedia, an online user manual (such as 'interactive' documentation), remote maintenance, remote training and/or remote surgery. In some embodiments, the collaborative editing includes 3-d objects and associated text information. These 3-d objects may include spatial image information between components in a given 3-d object, and one or more two-way links between the associated text information and the spatial image information.

In another embodiment, when a user is controlling an avatar, 'social commands' are displayed on display 130 and/or one or more of displays 128. Thus, instead of using emotes typed on a keyboard (e.g., '/smile'), which can be cumbersome, a user can activate one or more social commands by clicking on them using a touch screen or scroll wheel, or by moving portable electronic device 114-1. Moreover, the 'puppeteering' commands on display 128-1 may be context-sensitive, so that the most-appropriate options are displayed based on the current or an inferred user task (for example, a list of emotes may be displayed when the user is in the middle of a social interaction, and a list of tools may be displayed when the user selects an object). Thus, system 100 (FIG. 1) may facilitate collaborative interaction of the users in the 3-d virtual environment.

Figure 4:
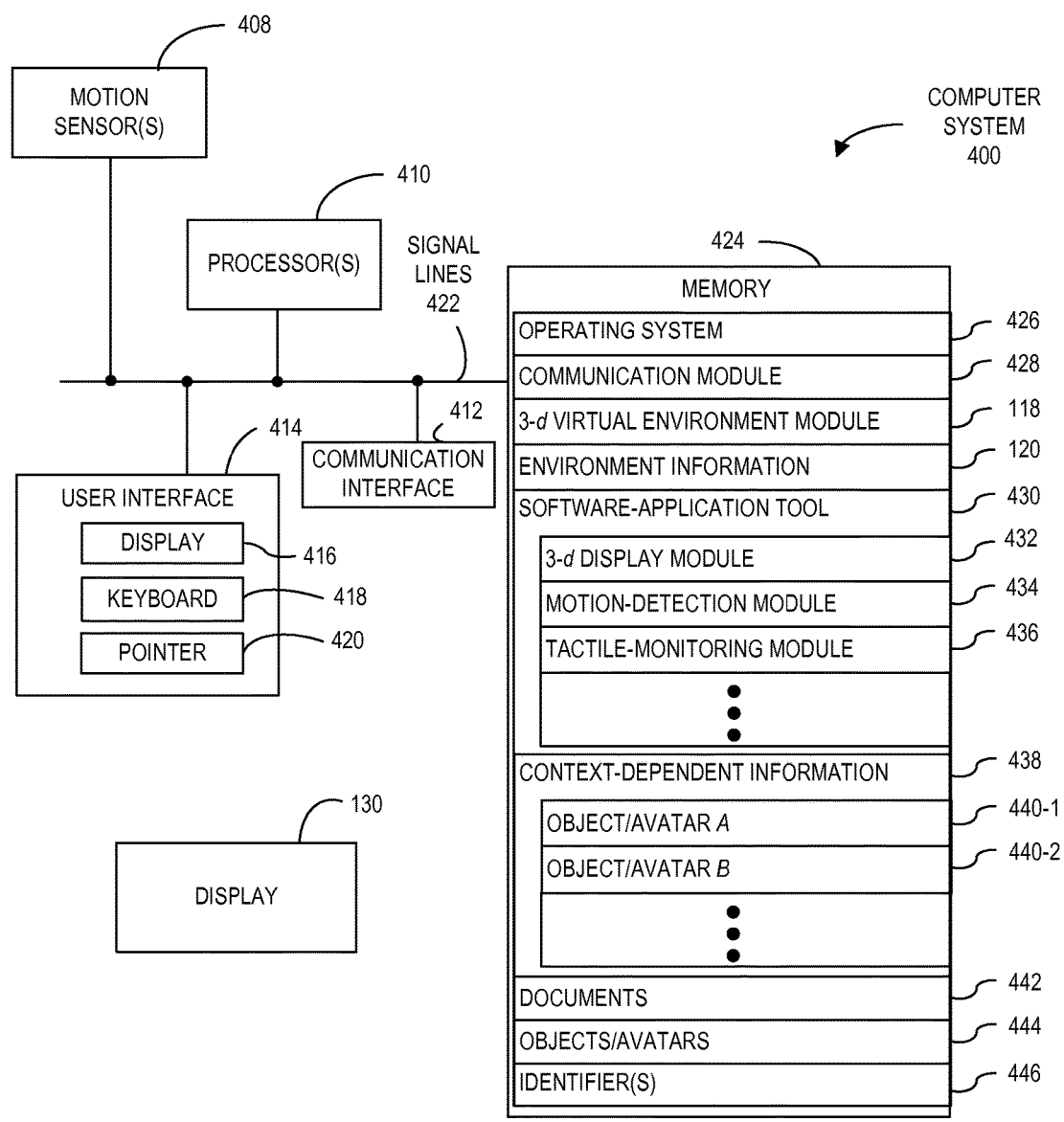
FIG. 4 is a block diagram illustrating a computer system in accordance with an embodiment of the present disclosure.

We now further describe embodiments of a computer system (which may be included in system 100 in FIG. 1) that performs process 200 (FIG. 2). FIG. 4 presents a block diagram illustrating a computer system 400, such as controller device 110 (FIG. 1) and/or a given one of the portable electronic devices 114 (FIG. 1). Computer system 400 includes: one or more motion sensors 408, one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. In some embodiments, the operating system 426 is a real-time operating system. While not shown in FIG. 4, in some embodiments memory 424 includes a web browser. Memory 424 may also store communication procedures (or a set of instructions) in a communication module 428. These communication procedures may be used for communicating with one or more computers, devices and/or servers, including computers, devices and/or servers that are remotely located with respect to the computer system 400.

Memory 424 may also include multiple program modules (or sets of instructions), including 3-d environment module 118 (or a set of instructions) and software application tool 430 (or a set of instructions). Furthermore, software application tool 430 may include: 3-d display module 432 (or a set of instructions), motion-detection module 434 (or a set of instructions), and/or tactile-monitoring module 436 (or a set of instructions). Note that one or more of these program modules (or sets of instructions) may constitute a computer-program mechanism.

As described previously, 3-d environment module 118 may access environment information 120, and may generate a 3-d virtual environment that is displayed on display 130. Moreover, users of software-application tool 430 on portable electronic devices 114 (FIG. 1) may manipulate or control one or more documents 442 or objects/avatars 444 via their portable electronic devices. In particular, one or more motion sensors 408 (and associated hardware controllers) may detect motion of a given portable electronic device. Then, motion-detection module 434 may interpret the detected motion. Alternatively or additionally, tactile-monitoring module 436 may interpret a user's interaction with display 416, such as a touch-sensitive display. Using communication module 428, these modules may forward a request for a subset of the information in the 3-d virtual environment, as well as for associated context-dependent information 438, such as context-dependent information for object/avatar A 440-1 and object/avatar B 440-2.

In response to the request, 3-d environment module 118 may provide, using communication module 428, instructions or signals containing the subset of the information and the associated context-dependent information 438. Then, 3-d display module 432 may display the subset of the information and the associated context-dependent information 438 on display 416. Next, the user may manipulate, control and/or change this content, while viewing common content on display 130. Note that 3-d environment module 118 may maintain a record of any modifications or changes in environment information 120 (which are forwarded by software application tool 430 in the given portable electronic device to 3-d environment module 118 using communication module 428) for future use by the users.

In some embodiments, one or more identifiers 446 are initially provided by the given portable electronic device using communication module 428. Based on the one or more identifiers 446, 3-d environment module 118 may log the user of the given portable electronic device into the system, and may provide an initial predefined subset of the information and associated context-dependent information 438 to the given portable electronic device using communication module 428. Furthermore, in some embodiments, 3-d environment module 118 may provide feedback, using communication module 428, to the user of the given portable electronic device, such as instructions to vibrate a component in user interface 414. For example, the component may be instructed to vibrate when a conflict occurs between two users' actions associated with the subsets of information on their respective portable electronic devices.

Instructions in the various modules in memory 424 may be implemented in: a high-level procedural language, an object-oriented programming language, and/or in an assembly or machine language. This programming language may be compiled or interpreted, i.e., configurable or configured, to be executed by the one or more processing units 410.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of the computer system 400 may be distributed over a large number of devices or computers, with various groups of the devices or computers performing particular subsets of the functions. In some embodiments, some or all of the functionality of computer system 400 may be implemented in one or more application-specific integrated circuits (ASICs) and/or one or more digital signal processors (DSPs).

Computers and servers in computer system 400 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, LAN, WAN, MAN, or a combination of networks, or other technology enabling communication between computing systems.

In some embodiments, system 100 (FIG. 1) and/or computer system 400 include fewer or additional components. Moreover, two or more components may be combined into a single component and/or a position of one or more components may be changed. Moreover, the functionality of system 100 (FIG. 1) and/or computer system 400 may be implemented more in hardware and less in software, or less in hardware and more in software, as is known in the art.

Figure 5:
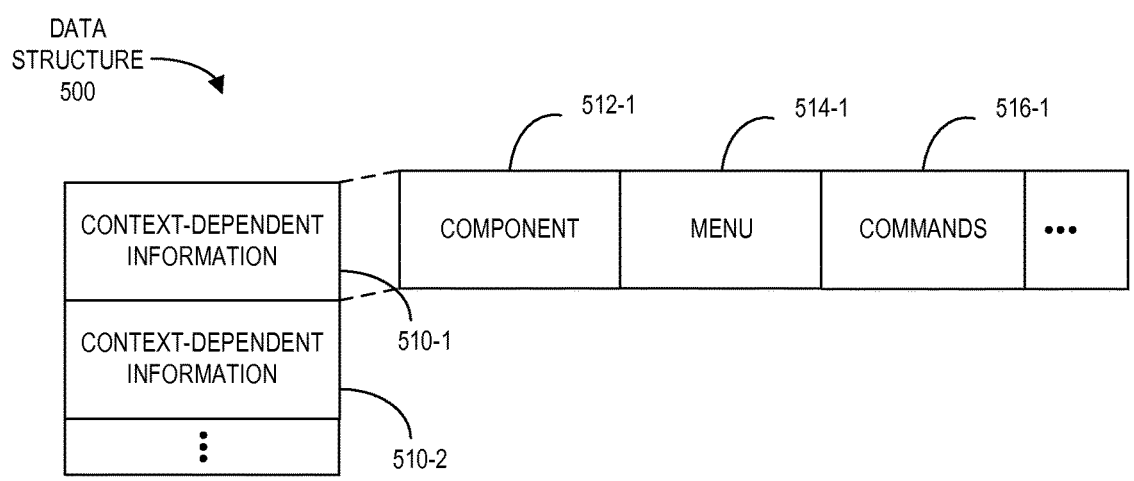
FIG. 5 is a block diagram illustrating a data structure in accordance with an embodiment of the present disclosure.

We now discuss data structures that may be used in computer system 400. FIG. 5 presents a block diagram illustrating a data structure 500. This data structure may contain context-dependent information 510. For example, context-dependent information 510-1 may include: an identifier for a component 512-1 (such as an object or an avatar), an associated menu 514-1, and commands 516-1 (such as social commands).

In some embodiments, data structure 500 includes fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed.

Accordingly, many modifications and variations will be apparent to practitioners skilled in the art. Additionally, the above disclosure is not intended to limit the present disclosure. The scope of the present disclosure is defined by the appended claims.

What is claimed is:

1. A system, comprising:
   a controller device, comprising:
   a first processor;
   a computer-readable medium coupled to the first processor storing instructions stored that, when executed by the first processor, cause the controller to perform a method comprising:
   storing in a data structure in a storage device context-dependent information associated with a 3-dimensional (3-d) environment comprising a plurality of inter-related 3-d components;
   displaying in a first display device coupled to a virtual world client the 3-d environment, wherein the virtual world client is coupled to the first computing device; and
   a portable electronic device, comprising:
   a second processor;
   a computer-readable medium coupled to the second processor storing instructions stored that, when executed by the second processor, cause the portable electronic device to perform a method comprising:
   communicating information with the controller device;
      sending a request to the controller device for a subset of the 3-d components and associated context-dependent information;
      receiving the subset of the 3-d components and associated context-dependent information stored in the storage device from the controller device based on the request;
   detecting a motion of the portable electronic device to modify the subset of the 3-d components;
   displaying in a second display device the modified subset of the 3-d components without changing the 3-d environment displayed on the first display device.

2. The system of claim 1, wherein the portable electronic device includes one or more of: a cellular telephone and an accelerometer.

3. The system of claim 1, wherein the method further comprises sending the modified subset of the 3-d components to the controller device.

4. The system of claim 1, wherein the 3-d environment includes virtual reality.

5. The system of claim 1, wherein the subset of the 3-d components includes at least a portion of an object or at least a portion of an avatar.

6. The system of claim 5, wherein the detected motion corresponds to a motion in the 3-d environment for the subset of the 3-d components; and
   wherein the motion in the 3-d environment includes linear motion, rotational motion, or both.

7. The system of claim 5, wherein the detected motion selects the object or the avatar in the 3-d environment.

8. The system of claim 7, wherein the object is selected using a gesture of the portable electronic device.

9. The system of claim 1, wherein the context-dependent information associated with the subset of the 3-d components includes a menu.

10. The system of claim 9, wherein the detected motion represents navigating through the menu.

11. The system of claim 1, further comprising multiple portable electronic devices that are associated with users, wherein a respective portable electronic device is configured to:
   modify a received subset of the 3-d components based on a detected motion of the portable electronic device; and
   display the modified received subset of the 3-d components and the associated context-dependent information to a corresponding user;
   wherein the 3-d environment displayed on the first display device includes information common to the users.

12. The system of claim 11, wherein subsets of the 3-d components displayed on at least two portable electronic devices are different.

13. The system of claim 11, wherein the system facilitates collaborative editing by the users of the information in the 3-d environment.

14. The system of claim 11, wherein the system facilitates collaborative interaction of the users in the 3-d environment based on the detected movements of the portable electronic devices.

15. The system of claim 11, wherein the controller device provides feedback to at least two of the users via the associated portable electronic devices in response to a conflict between changes to the information provided via the associated portable electronic devices occurring in the 3-d environment.

16. The system of claim 1, wherein the second display device includes a touch-sensitive surface; and
   wherein the second display device is configured to display the subset of the 3-d components and the associated context-dependent information based on a user interaction with the surface of the second display device.

17. The system of claim 1, wherein the portable electronic device is configured to provide a unique identifier to the controller device; and
   wherein a request to the controller device includes the unique identifier.

18. A method for interacting with a 3-d environment, comprising:
   storing, by a computer system in a data structure in a storage device,
   context-dependent information associated with the 3-d environment;
   providing information associated with the 3-d environment to a virtual world client, wherein the 3-d environment is to be displayed on a first display device coupled to the virtual world client;
   receiving, by the computer system, from a portable electronic device comprising a second display device, a request for a subset of the 3-d components and associated context-dependent information;
   obtaining the associated context-dependent information from the data structure;
   in response to receiving the request, providing to the portable electronic device the requested subset of the 3-d components and the associated context-dependent information without changing the 3-d environment displayed on the first display device, wherein the subset of the 3-d components and the associated context-dependent information is to be displayed on the second display device; and
   receiving a modified subset of the 3-d components, wherein the subset of the 3-d components is modified based on the portable electronic device detecting a motion of the portable electronic device.

19. A computer-program product for use in conjunction with a system, the computer-program product comprising a non-transitory computer-readable storage medium and a computer-program mechanism embedded therein to facilitate interaction with a 3-d environment, the computer-program mechanism including:
  instructions for storing, by a computer system in a data structure in a storage device, context-dependent information associated with the 3-d environment comprising a plurality of inter-related 3-d components;
  instructions for providing information associated with the 3-d environment to a virtual world client, wherein the 3-d environment is to be displayed on a first display device coupled to the virtual world client;
  instructions for receiving from a portable electronic device a request for a subset of the 3-d components and associated context-dependent information;
  instructions for obtaining the associated context-dependent information from the data structure;
  instructions for, in response to receiving the request, providing to the portable electronic device the subset of the 3-d components and the associated context-dependent information without changing the 3-d environment displayed on the first display device, wherein the subset of the 3-d components and the associated context-dependent information is to be displayed on a second display device of the portable electronic device; and
  instructions for receiving a modified subset of the 3-d components, wherein the subset of the 3-d components is modified based on the portable electronic device detecting a motion of the portable electronic device.

20. The computer-program product of claim 19, wherein the computer-program mechanism includes:
  instructions for receiving requests from a plurality of portable electronic devices, which are associated with users, for subsets of the 3-d components and associated context-dependent information, wherein a respective request from a respective portable electronic device is based on a detected motion of the respective portable electronic device, and wherein the detected motion of the respective portable electronic device includes linear motion, rotational motion, linear and rotational motion, or a gesture; and
  instructions for obtaining the context-dependent information associated with the subsets of the 3-d components from the data structure;
  instructions for providing to the portable electronic devices the subsets of the 3-d environment and the associated context-dependent information, wherein the subsets of the 3-d environment and the associated context-dependent information are to be displayed on respective display devices of the portable electronic devices without changing the 3-d environment displayed on the first display device;
  wherein the 3-d environment displayed on the first display includes information common to the users.

21. The computer-program product of claim 20, wherein subsets of the 3-d components provided to at least two portable electronic devices are different.

22. The computer-program product of claim 20, wherein the computer-program mechanism includes instructions for providing feedback to at least two of the users via the associated portable electronic devices in response to a conflict between changes to the information provided via the associated portable electronic devices occurring in the 3-d environment.

* * * * *